US006897866B1

(12) United States Patent
Hetzler et al.

(10) Patent No.: US 6,897,866 B1
(45) Date of Patent: May 24, 2005

(54) METHOD AND APPARATUS FOR ENTITY RELATIONSHIP VISUALIZATION

(75) Inventors: Elizabeth G. Hetzler, Kennewick, WA (US); Susan L. Havre, Richland, WA (US); Wyllona M. Harris, Kennewick, WA (US); Daniel T. Donohoo, Kennewick, WA (US); Paul D. Whitney, Richland, WA (US); Grant C. Nakamura, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/365,342

(22) Filed: Jul. 30, 1999

(51) Int. Cl.[7] ................................................ G06T 11/20
(52) U.S. Cl. ..................................................... 345/440
(58) Field of Search ............................. 345/440, 440.1, 345/440.2, 441, 442, 443, 802, 853, 839, 866, 619; 707/5, 1, 10, 531, 532; 382/224, 225, 226, 227, 228, 229, 230, 305

(56) References Cited

U.S. PATENT DOCUMENTS

| | | | | |
|---|---|---|---|---|
| 4,953,106 A | * | 8/1990 | Gansner et al. ............. | 345/440 |
| 5,179,643 A | * | 1/1993 | Homma et al. ............. | 345/440 |
| 5,485,564 A | * | 1/1996 | Miura ......................... | 345/440 |
| 5,751,931 A | * | 5/1998 | Cox et al. ................... | 345/440 |
| 5,794,178 A | * | 8/1998 | Caid et al. ...................... | 704/9 |
| 5,821,945 A | * | 10/1998 | Yeo et al. .................... | 345/440 |
| 5,835,085 A | * | 11/1998 | Eick et al. ................... | 345/853 |
| 6,100,901 A | * | 8/2000 | Mohda et al. ............... | 345/440 |
| 6,137,911 A | * | 10/2000 | Zhilyaev ...................... | 382/225 |
| 6,154,220 A | * | 11/2000 | Prakriya et al. ............. | 345/440 |
| 6,205,576 B1 | * | 3/2001 | Rajala et al. ................ | 717/105 |
| 6,298,174 B1 | * | 10/2001 | Lantrip et al. .............. | 382/305 |

OTHER PUBLICATIONS

M.–A.D. Storey et al., "On Integrating Visualization Techniques for Effective Software Exploration", p. 38–45, 1997.
S.K. Card et al., "The WebBook and the Web Forager: Video Use Scenarios for a World–Wide Web Information Workspace", p. 416–417, 1996.
T. Munzner. "Laying Out Large Directed Graphs in 3D Hyperbolic Space", p. 2–10, 1997.
S.G. Rick, "Aspects of Network Visualization", p. 69–72, 1996.
R.A. Becker et al., "Visualizing Network Data", p. 16–28, 1995.
N. Gershon et al., "Case Study: Visualizing Internet Resources", p. 122–128, 1995.

* cited by examiner

*Primary Examiner*—Matthew Luu
(74) *Attorney, Agent, or Firm*—Douglas E. McKinley, Jr.

(57) ABSTRACT

The method and apparatus of the present invention begin with the generally known features of visualizing a relationship between at least two entities, by: (a) geometrically mapping the at least two entities onto a surface; (b) providing a relationship record for each of the at least two entities; (c) generating a display of the at least two entities together with at least one connector between the at least two entities as the visualizing the relationship from the relationship record; (d) the connector having two ends connected to a pair of the at least two entities, the connector having an extension between the two ends, the extension passing out of the plane. The present invention provides the improvement of: for at least one pair of entities, the at least one pair having a plurality of relationships, the connector having a plurality of strands wherein each of the plurality of strands corresponds to each of the plurality of relationships.

21 Claims, 1 Drawing Sheet

METHOD AND APPARATUS FOR ENTITY RELATIONSHIP VISUALIZATION

This invention was made with Government support a contract awarded by the U.S. Government. The Government has certain rights in the invention.

FIELD OF THE INVENTION

The present invention is a method and apparatus for entity relationship visualization.

As used herein, the term "surface" is used in its geometric sense as two dimensional and includes the special case of a "plane".

BACKGROUND OF THE INVENTION

"A picture is worth a thousand words," represents the economy of scale that is continually sought in this era of information explosion. More specifically, visually representing the contents of large text corpora decreases the amount of time an analyst would spend reading and sorting documents and increase the amount of time spent on understanding the corpus. Visual representations may also lead to the discovery of insight not previously anticipated. Many representations have been implemented, each with certain limitations. Keywording is quite common and well known, but has the limitation that an analyst must still do a significant amount of reading to understand the corpus. Artificial intelligence and/or natural language processing has been employed with limited success and with limited speed in part because of complexity of operation of these tools.

A tool known as SPIRE (Spatial Paradigm for Information Retrieval and Exploration) is an example of a tool that uses multiple implicit relationships to analyze text documents. SPIRE integrates a text analysis engine, clustering and dimensionality reduction capabilities, and visual representations into an analyst's tool suite. SPIRE is described in detail in U.S. patent application Ser. No. 08/695,455 now abandon, hereby incorporated by reference. Briefly, unprocessed text is input to a text engine that converts each document to a high dimensional vector. The high dimensional vectors are clustered, followed by a projection from the high dimensions (hundreds) to two dimensions for visualization as points on a plane to produce a galaxies visualization. The more implicit attributes—such as topic terms—are shared, the more similar the documents are assumed to be and the closer they appear in the Galaxies visualization. Similarly, topics that appear together in relatively high numbers of documents are assumed to be conceptually related and are used to define themes in the corpus of information. A landscape metaphor is used to show major themes in the collection.

The disadvantage of this approach is that an analyst is not able to immediately see relationships between documents except as grouped as clusters or as depicted in the landscape as a mountain peak. The analyst must perform additional steps to understand individual relationships between documents, clusters or themes.

All information has either explicit or implicit relationships to other information. Relationships are explicit when discrete attributes are shared, such as numerical values, authors, dates, illustrative material, or specific references are made (i.e., web hotlinks). Explicit relationships are the source of links in relational databases and the traditional context for visualizing information as "link and node" diagrams. A large quantity of explicit relation data exists in database repositories. However, far more data exists with implicit, rather than explicit, relationships. Implicit relationships between units of information exist when they share context or content, but not specific discrete attributes. For example, text units that use similar terms have an implicit relationship; that is, they share certain attributes to some degree. Although SPIRE uses these implicit relationships to define the similarity of text units, the user is faced with the task of discovering these relationships by interacting with the visualizations.

There are some systems which have been built to visually show relationships among entities. Examples include systems that show call dependencies in computer code [Storey 1997] Storey, M., et al. (1997). On Integrating Visualization Techniques for Effective Software Exploration. In Information Visualization '97. Proc. October 1997, Phoenix: IEEE Computer Society, p. 38–45; and systems that show visualizations of World Wide Web link structures [Card 1996] Card, S., Robertson, G., and York, W. (1996). The Webbook and the Web Forager: An Information Workspace for the World-Wide Web. In: ACM SIGCHI '96. Proc. Vancouver, Canada, April 1996; [Munzner 1997] Munzner, T. (1997). H3: Laying Out Large Directed Graphs in 3D Hyperbolic Space. In: Information Visualization '97. Proc. Oct. 1997, Phoenix: IEEE Computer Society, p. 2–10. Another example is the use of arcs between locations on a globe or map to portray network traffic between the corresponding physical locations [Eick 1996] Eick, Stephen, in IEEE Computer Graphics and Applications, March 1996. A two-dimensional matrix approach to showing relationships has also been applied by [Becker 1995] Becker, R., Eick, S., and Wilks, A. (1995). Visualizing Network Data. In: IEEE Transactions on Visualization and Computer Graphics. Vol. 1, No. 1, March 1995, p. 16–28, to portray telephone network overload among major cities and by [Gershon 1995] Gershon, Nahum, LeVasseur, Joshua, Winstead, Joel, Croall, James, Pernick, Ad, Ruh, William. (1995). Case Study of Visualizing Internet Resources. In: Information Visualization '95. Proc. IEEE Computer Society, p. 122–128, to portray how words appear near each other in documents. Other visualizations include maps of airline flight routes between airports are done with a method of visualizing a relationship between at least two entities. The steps of the method may be summarized as:

(a) geometrically mapping the at least two entities onto a surface;

(b) providing a relationship record for each of the at least two entities;

(c) generating a display of the at least two entities together with at least one connector between the at least two entities as visualizing the relationship from the relationship record; and (d) the connector having two ends connected to a pair of the at least two entities, the connector having an extension between the two ends, the extension passing out of the surface.

Although this method has the advantage that it does portray individual relationships among entities, the visualizations for even a moderately complex set of relationships quickly become cluttered and difficult to understand.

Hence, there is a need in the art of visual representations for a method of visualizing two or more relationships between at least two entities at one or more levels of abstraction to further enable the analyst to quickly explore the corpus, leveraging the natural visual processing strengths of the human brain for multi-variate data.

SUMMARY OF THE INVENTION

The method and apparatus of the present invention begin with the generally known features of visualizing a relationship between at least two entities, by:

(a) geometrically mapping the at least two entities onto a surface;

(b) providing a relationship record for each of the at least two entities;

(c) generating a display of the at least two entities together with at least one connector between the at least two entities as. visualizing the relationship from the relationship record; and (d) the connector having two ends connected to a pair of the at least two entities, the connector having an extension between the two ends, the extension passing out of the surface, the connector having a plurality of strands wherein each of the plurality of strands corresponds to each of a plurality of relationships.

Steps (a) and (b) are interchangable. In the present invention, relationships include explicit relationships, implicit relationships and combinations thereof.

More specifically, the visualization provided by the present invention combines various methods of aggregation, such as representing relationships among clusters including an option to represent the presence of at least one relationship or to show all relationships between clusters or entities thereof, and using thresholds for deciding presence of relationships. It preferably uses a rainbow metaphor where colors portray the detail about types of relationships. In addition, "negative" rainbows portray strong evidence of disassociation among entities.

Some additional applications suggested for this metaphor include: Information Assurance: using specific computers as the entities, represent legitimate network or computer accesses as positive arcs and attempts at break-in as negative ones; Legal research: using court cases as entities, represent supporting relationships (e.g., decision upheld) as positive arcs, and contrary relationships (e.g., decision overturned) as negative ones; Medical: using symptoms as entities, represent symptoms that often appear together or have a cause-effect relationship as positive arcs and ones that do not appear together as negative ones.

Thus, it is an object of the present invention to provide a method of entity relationship visualization.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
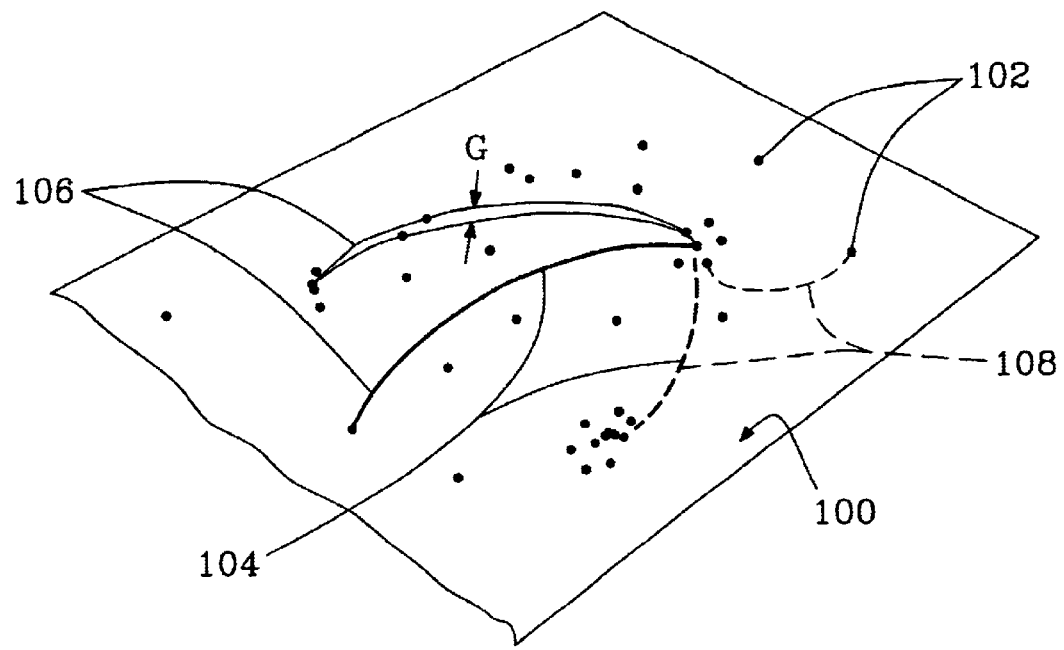
FIG. 1 is an isometric view of a visualization according to the present invention.

Referring to FIG. 1, a surface 100 is provided with points 102 representing individual entities. Strands or lines 104 indicate relationship between points 102. Solid lines 106 are visible above the surface 100, whereas broken lines 108 are "invisible" or hidden below the surface 100. Where more than one relationship is depicted between two points 102 on the same side of the surface 100, a gap G is used to distinguish the lines.

In addition to or as an alternative, each strand 104 may be further distinguished with a texture. The texture includes but is not limited to line type, line weight, color, display frequency, and combinations thereof. Line type is solid or broken. Broken includes any number of broken line patterns including but not limited to dashed, dotted, hashed, and combinations thereof. Color is a frequency including single frequency or frequency band distinguishable from white light within the visible spectrum. Display frequency is a pulsed display.

The present invention includes a method and apparatus for visualizing a relationship between at least two entities. The method has the steps of:

(a) mapping the at least two entities onto a surface;

(b) providing a relationship record for each of the at least two entities;

(c) generating a display of the at least two entities together with at least one connector between the at least two entities as the visualizing the relationship from the relationship record; and (d) the connector having two ends connected to a pair of the at least two entities, the connector having an extension between the two ends, the extension passing out of the surface, the connector having a plurality of strands wherein each of the plurality of strands corresponds to each of a plurality of relationships.

In the present invention, entities include but are not limited to people, places, or concepts having a textual description associated with each entity. The entities are represented as small dots on a two-dimensional plane. Their location represents a summarization of one kind of relationship among them; entities that are close are more related than entities that are far apart as in SPIRE. In a preferred embodiment, the entities are topics determined by SPIRE using the following process. The first step is to compress the vocabulary of the database through a series of filters. One to three filters may be employed, the frequency filter, the topicality filter and the overlap filter. The frequency filter first measures the absolute number of occurrences of each of the words in the database and eliminates those which fall outside of a predetermined upper and lower frequency range. The topicality filter then compares the placement of each word within the database with the expected placement assuming the word was randomly distributed throughout the database. By expressing the ratio between a value representing the actual placement of a given word (A) and a value representing the expected placement of the word assuming random placement (E), a cutoff value may be established wherein words whose ratio A/E is above a certain predefined limit are discarded. In this manner, words which do not rise to a certain level of nonrandomness, and thus do not represent topics, are discarded. The overlap filter then uses second order statistics to compare the remaining words to determine words whose placement in the database are highly correlated with one and another. Measures of joint distribution are calculated for word pairs remaining in the database using standard second order statistical methodologies, and for word pairs which exhibit correlation coefficients above a preset value, one of the words of the word pair is then discarded as its content is assumed to be captured by its remaining word pair member.

When all three filtering steps are used, the number of words in the database is typically reduced to approximately ten percent of the original number. In addition, the filters have discriminated and removed words which are not highly related to the topicality of the documents which contain them, or words which are redundant to words which reveal the topicality of the documents which contain them. The remaining words, which are thus highly indicative of topicality and non-redundant, are then ranked according to some predetermined criteria designed to weight them according to their inherent indicia of content. For example, they may be ranked in descending order of their frequency in the database, or according to ascending order according to their rank in the topicality filter.

The filtered words thus ranked are then cut off at either a predetermined limit or a limit generated by some parameter relevant to the database or its characteristics to create a reduced subset of the total population of filtered words. This subset is referred to as a topic set, and may be utilized as both an index and/or as a table of contents. Alternatively, the candidate topic set may be presented to the user who could select the subset of words of interest.

Once the entities are selected, the next step is to place them on a surface. In a preferred embodiment, the entities are represented as small dots on a two-dimensional plane. Their location is determined using a two-way document/topic iteration logic (TWIDL). This method is faster than SPIRE and provides better grouping compared to SPIRE. Iteration may begin either with topic vectors or documents vectors; the former is described here. Each topic is given a topic vector; the initial topic vectors are arbitrary, and preferably unique. Next each document is given a document vector. For a given document, the document vector is the sum of each topic vector multiplied by the number of times that topic occurs in the document. Next each topic is given a new vector in the same manner: The topic vector is the sum of each document vector multiplied by the number of times the topic occurs in that document. The process continues iterating; the number of iterations is preferably less than 5 and more preferably 2 or 3. Optionally, there may be a vector normalization between iterations. A principle components analysis of the resulting topic vectors provides planar locations for them. Additionally, K-means clustering techniques can be used to determine clusters of these entities.

The next step is the relationship record for the entities. Co-occurrence is one potential relationship. A preferred embodiment for calculating co-occurrence is to create for each topic or entity a vector of length n, where n is the number of documents. The vector elements show how many times the topic occurs in each document. Such vectors can be evaluated for associations via a number of mathematical or statistical approaches. A preferred measure is cosine distance. The cosine distance takes two of the vectors and returns a number between 0 and 1. Values close to 0 indicate that the two entities rarely (if ever) occurred in the same text. Values close to 1 indicate that the two entities occurred together in the text. Thus, potential disassociations were indicated for pairs of concepts/characters with a distance near 0, and potential associations were indicated for pairs of concepts/characters with a distance near 1. Other relationships between entities include but are not limited to (2) utterance-based measures of association between individuals, for example whether an individual mentions other individuals or concepts of interest, or whether there is an association between individuals by measuring similarity in utterances; and (3) context-based measures of association between individuals wherein similarity of individuals is gauged based on the similarity of surrounding text.

Further examples of relationships are given in Table 1.

TABLE 1

Linkage and Association Taxonomy

Word-Based Relationships

Same word co-occurs (disambiguation is important here)
Same name co-occurs
Same vocabulary is used in both documents
Images are similar (images are to complex documents as words are to simple documents)

TABLE 1-continued

Linkage and Association Taxonomy

Attribute-Based Relationships
Attributes having to do with the creation of the document:

Same author
Same source (e.g., organization)
Place of origin/nationality
Who was involved in creation or meeting
Same date range (publication, when work reported, etc.)
Time of creation relative to others
Attributes or the content:

Same level of detail
Same amount of hard data
Same style
Same technique (as in cinematography; could apply to images, videos)
Single topic vs. multi-topic
Small/large (size of the document or object)
Attributes of the construction tools:

Same media (e.g., equivalent info expressed in different media)
A uses same instruments (music) as B
Language
A uses same palette as B (e.g., paintings with same color palette)
Categorizations outside of the document itself:

Same index terms/keywords
Same genre
Topic- (or Meta-Topic) Based Relationships

Same topic
A's topic is subset of B's topic
Same process or sequence of topics
Loyalties expressed
Document-To-Document Topological Relationships
Conceptual equivalents:

A is copy of B
A is translation of B
A is paraphrase of B
A is transcription of B (audio)
Conceptual or physical subpieces:

A is subpiece of B
A is abstract for B
A is Table of Contents for B
A is an enlargement of part of B (e.g., maps)
Further work:

A is developmental form/stage of B
A indexes B
A updates/corrects B
A acknowledges B as source of idea, data, eponym
A is application of theory espoused in B
A builds on/expands work in B
A draws conclusions from premises in B
A clarifies or explains B
Having to do with sequences, either physical or conceptual:

A follows B in a sequence
Memo trail of a project/engagement (perhaps cross-departments)
A alerts to forthcoming work B
Topological assignment by author (e.g., photo series by same author)
Critic sequences and compares works, such as 1984 vs. Brave New World
User defines sequence of interest
Lecture on test vs. test results
Spatial relationships:

right of, left of (e.g., photos of adjacent objects)
metaphorically right or left of
A shows another perspective (as in pictures which show a different angle of vision) of objects in B
Exemplar docs which may provide organization of other docs:

bibliographic
categorical
Same collection

TABLE 1-continued

Linkage and Association Taxonomy

Document-To-Document Influence Relationships
Resulting:

News group question and answer
Cause/effect
A is one of the consequences of B
Implications of
A reviews/critiques/describes B
Positive response:

A substantiates findings of B
A supports (lends support to assertions in) B
Negative response:

A contradicts B
Usage-Based Relationships
Having to do with users:

All papers my boss has read
Documents that were highly rated according to a given user's profile
As discovered in user's choice of visualization techniques in previous
results (i.e., the user's process of visualizing the documents did itself
reveal relationships between them. For example, these documents were
selected and expanded. These documents were hidden, etc.)
Having to do with tasks:

Part of the same task (e.g., permission to travel to a conference vs.
expense report filled afterward)
Relationships Based on Outside Events
As related to preceding or concurrent event:

Same biases, same perspective
Same underlying assumptions
Influenced by same event (e.g., WWII)
Same situation (attitudes, sequence of events) prevalent at the
time of creation
As related to future events:

Same purpose
Other
Generic relationships:

A links to B/A cites B
A in some unknown way related to B
Existence of a relationship within an information space
(independent of documents)
External (i.e. corpus independent) relations, e.g. WordNet
relationship may be suspected but not revealed
Non-relationships:

non-relationship/null-set/not related
Meta-relationships:

Search for Content within some context or multiple contexts.
Simultaneous views of content within context(s).
Properties of Relationships:

Probability that the relationship is real (I think, i know, Here's proof,
Someone else thinks, knows)
Strength
Repetition
Direction
Reciprocity
Transitivity
Change in linkage
Agrees with or disagrees with rules or other known items Relationships are then passed to a graphics program for display on the screen. In the preferred embodiment, one class of relationship is shown as arcs above the surface. These arcs can be used to show evidence of a strong relationship that has been found via the mathematical approaches discussed above. In the present invention a fixed threshold value is set for each test, and any value above that threshold was viewed as a strong relationship. A third class of relationship is shown as arcs (possibly textured) that go below the surface. These may be used to portray evidence of a disassociation—in the present invention these were values below a lower threshold.

The present invention also provides the ability to display and interact with the data at various levels of detail. A white arc between two clusters indicate that relationship(s) exist(s) between entities within the clusters. The white arc can be expanded to show multiple colors (as in the spectrum), each indicating existence of a particular kind of relationship within this class. If the user is interested in a particular type of relationship, the legend can be used to "turn on" all relationships of that type.

If clusters of multiple entities are used, relationship arcs will first be drawn from cluster centroid to cluster centroid. The thickness of the arc represents the percentage of cluster members participating in that relationship. The user may choose to reveal which entities in the cluster contribute to these relationships with "crow's feet", or may expand the detail to show all entity—entity relationships between the two clusters. In addition, the relationships may be grouped by type rather than by cluster.

This method may be used to show relationships which are unidirectional as well as those that are bi-directional. An example of a unidirectional relationship is the relationship "contains." An entity A may contain another entity B but B will not contain A. Attributes of the arc strands may be used to indicate whether the relationships are bi-directional or unidirectional, or even to show the direction of the relationship.

EXAMPLE 1

An experiment was conducted to demonstrate the present invention using a diverse collection of documents related to Shakespeare and using a collection of speeches by Fidel Castro.

All documents were found on the World Wide Web from a variety of sites. The Shakespearean data comprised the scenes from all of Shakespeare's plays, critiques, descriptions of paintings illustrating Shakespearean scenes, essays and debates on the actions of Richard III, historical accounts of time periods portrayed in the plays, and essays and debates on whether plays attributed to Shakespeare were actually authored by others. The Castro dataset included speeches made in a variety of contexts over a forty year period.

With the Shakespearean data, many of the documents were scenes from the plays, and each time a character spoke, their name appeared at the beginning of their lines. To counter this effect, each scene was broken into subparts, one for each speaking character, and the speaker's name removed from the text. Thus we had one document for Hamlets lines from Hamlet Act 1, Scene 1 and a different document for each other character in that same scene. A SPIRE analysis of the repartitioned scenes was done. In this case, the character names are generally those uttered by the speaker. We also see the emergence of several words dealing with themes such as love, king, god, duke, etc. This repartitioning also enabled easier examination of measures of "who said what."

The topics identified by SPIRE were mostly character names, with a few concepts. The fundamental data used for measurements of association and dissociation of a character or concept were based on counting the number of times the word(s) indicating the character/concept appeared in a document chunk (e.g., an essay, critique, or portion of a play). Additionally investigated was an utterance-based measure, using an analysis of "who-said-what" within the corpus. This was a simple determination of whether a speaker "mentioned"another character or concept of interest. In some texts characters were mentioned in plays where they do not appear—thus the combination of "mention" relationships and co-occurrence relations became interesting.

The first step in assessing entity—entity relationships was selecting the entities of interest. For the Shakespearean data-set, the selection was the set of topics and high topicality cross-terms selected by the SPIRE analysis.

The table below shows occurrence data for some characters occurring or mentioned in Shakespeare's plays.

TABLE E1-1

Occurrence of selected characters in a subset of documents.

| Character | Romeo & Juliet 1.0 | Romeo & Juliet 1.1 | Romeo & Juliet 1.2 | Romeo & Juliet 1.3 | Romeo & Juliet 1.4 | York Debate 1 | York Debate 2 | York Debate 3 |
|---|---|---|---|---|---|---|---|---|
| Antony | 0 | 0 | 0 | 0 | 0 | 0 | 0 | 0 |
| Caesar | 0 | 0 | 0 | 0 | 0 | 3 | 1 | 0 |
| Romeo | 0 | 20 | 13 | 0 | 15 | 1 | 0 | 0 |
| Tybalt | 0 | 4 | 1 | 0 | 0 | 0 | 0 | 0 |

These data can be viewed as providing a vector for each character or concept. Such data can be evaluated for associations via a number of mathematical or statistical approaches. The cosine distance was used as a measure of entity association. Cosine distance close to 0 indicates that the two characters or concepts rarely (if ever) occurred in the same text. Cosine distance close to 1 indicates that the two characters occurred together in the text.

Association evidence was also compared within various subgroups of the collection. For example, some characters were related within the play critiques but not within the plays themselves. In addition to such co-occurrence relationships, instances were identified where one character mentioned terms of interest, such as other names or chosen concepts. Note that the data in Table E1-1 are indicative of a disassociation between Caesar and Tybalt and positive association between Romeo and Tybalt.

Figure 2:
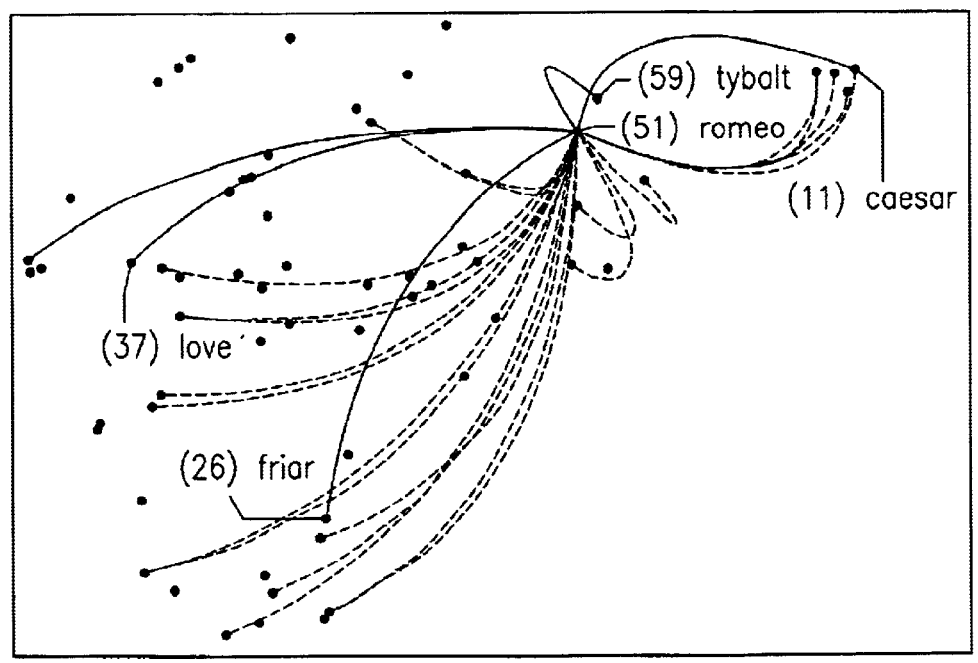
FIG. 2 is an isometric view of a visualization using Shakespearean texts according to Example 2.

A prototype visualization, called "Rainbows," provided a good method for displaying the results (see FIG. 2). In FIG. 2 the entities (in this case, mainly Shakespearean character names) are displayed as dots on a plane (the dots were a green color on the computer screen). The location of the dots was determined by how the names appeared within the lines of the Shakespearean plays; names that tend to appear together are shown closer together on the plane. Mathematical clustering techniques were used to determine groups of characters. Further, various arcs illustrated examples of relations. FIG. 2 shows relationships between selected characters and concepts, specifically relationships pertaining to Romeo. Note the expected (positive) associations to "friar," to Tybalt, and to love, and the unexpected one to Caesar. Some of the debate documents in the collection mention both Romeo and Caesar.

The second data collection used for entity—entity measures was the set of speeches by Fidel Castro. In the Castro data set, co-occurrence relations were calculated, namely: (1) within documents for each year, to see how the associations might vary over time; (2) within the set of documents that came from each source country, to see if there were differences in how words were associated in the Cuban documents vs. the American documents for example; and (3) within each type of document, to see for example if there were differences between associations in the speeches as opposed to the interviews. The results of our analysis showed interesting differences among the various combinations.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of visualizing a relationship between at least two entities, having the steps of:
   a. mapping the at least two entities onto a surface by two-way document/topic iteration logic;
   b. providing a relationship record for each of the at least two entities;
   c. generating a display of the at least two entities together with at least one connector between the at least two entities for said visualizing said relationship from said relationship record; and
   d. said connector having two ends connected to a pair of said at least two entities, said connector having an extension between said two ends, said extension passing out of said surface, said connector having a plurality of strands wherein each of said plurality of strands corresponds to each of a plurality of relationships.

2. The method as recited in claim 1, wherein at least one of said plurality of strands passes out of said surface on one side of said surface and another of said plurality of strands passes out of said surface on an opposite side of said surface.

3. The method as recited in claim 1, wherein said each strand is distinguished from other strand(s) by a geometric gap therebetween.

4. The method as recited in claim 3, wherein said each strand has an arc height.

5. The method as recited in claim 4, wherein a missing strand is observed as a greater gap between remaining strands.

6. The method as recited in claim 1, wherein said each strand is further distinguished with a texture.

7. The method as recited in claim 6, wherein said texture is selected from the group consisting of line type, line weight, color, display frequency, and combinations thereof.

8. The method as recited in claim 7, wherein said line type is selected from the group consisting of solid, and broken.

9. The method as recited in claim 8, wherein said broken is selected from the group consisting of dashed, dotted, hashed, and combinations thereof.

10. The method as recited in claim 7, wherein said color is a frequency within the visible spectrum.

11. The method as recited in claim 7, wherein said display frequency is a pulsed display.

12. The method as recited in claim 1, wherein said plurality of strands is displayed as said plurality of strands.

13. The method as recited in claim 1, wherein said at least two entities are clusters of members, said clusters having centroids, and said connector connects said centroids.

14. The method as recited in claim 13, wherein substrands extend from each of said members to said connector connecting said centroids.

15. The method as recited in claim 1, further comprising the step of positioning said display.

16. The method as recited in claim 15, wherein said positioning is selected from the group consisting of rotate, pan, zoom and combinations thereof.

17. The method as recited in claim 2 wherein the strands shown on one side of tile surface indicate values exceed an upper threshold of a test and the strands on the other side of the surface indicate values lower than a low threshold for said test.

18. The method as recited in claim 17 wherein a change in either or both of said threshold value(s) causes strands to appear or disappear.

19. The method as recited in claim 1, wherein a user action may cause the display of all relationships corresponding to a given relationship type.

20. The method as recited in claim 1 wherein a directionality of a relationship is indicated by line type.

21. The method as recited in claim 1, wherein a user action may cause the display of either a single strand, aggregate strand, or multitextured strands.

* * * * *